March 15, 1966   J. E. SPERZEL   3,239,874
FRICTION HINGE
Filed Sept. 27, 1963
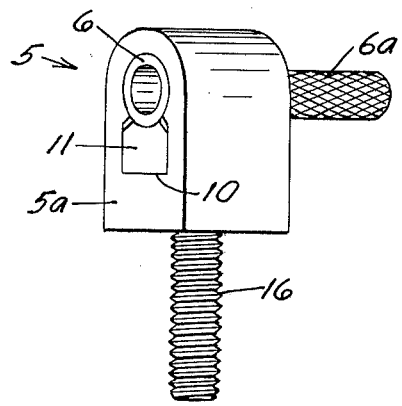
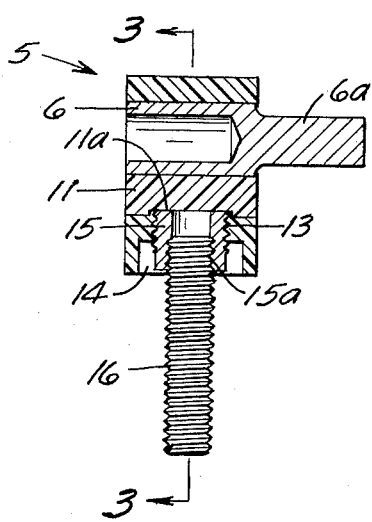
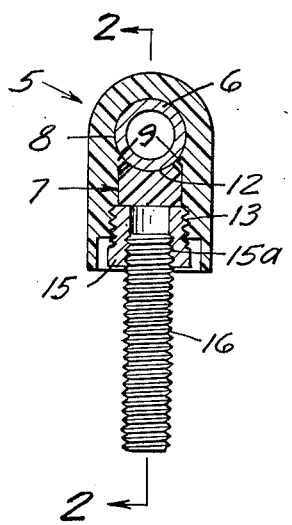
INVENTOR
JOHN E. SPERZEL
BY
Williamson + Palmatier
ATTORNEYS United States Patent Office 3,239,874
Patented Mar. 15, 1966

3,239,874
FRICTION HINGE
John E. Sperzel, 949 N. Valley Road, Paoli, Pa.
Filed Sept. 27, 1963, Ser. No. 312,024
2 Claims. (Cl. 16—140)

This invention relates to friction hinges capable of sustaining and holding the parts connected thereby in any predetermined or desired position or relationship by the frictional engagement of the hinge components.

The friction hinge of this invention is applicable to any situation where it is desirable to hingedly connect two parts together and be able to maintain the parts connected thereby in a plurality of different positions relative to each other through frictional resistance provided by the frictional engagement of the hinge components. Thus, for example, the hinge of this invention is applicable to the hoods and trunk lids of automobiles for maintaining same in selected raised positions; to doors and windows for maintaining same at selected open positions; to the window visors and rear view mirrors of automobiles to eliminate repeated adjustment thereof; to outboard motors to ease the raising and lowering thereof when mounted on a boat; to machine tools such as drill press chucks and bench saws for facilitating the raising and lowering thereof and holding same in selected predetermined positions; to lamps and light fixtures which must be raised and lowered; and to household pots and pans for supporting covers thereon. The aforementioned applications are merely illustrative of a few of the innumerable uses to which the hinge of this invention can be applied, it being anticipated that the friction hinge of this invention will replace many conventional freely movable hinges in order to attain the desired results made possible by the friction hinge of this invention.

Also, most conventional friction hinges provide a metal to metal contact between the engaging relatively movable bearing surfaces of the hinge components, which metal to metal contact usually results in a noisy squeaky hinge and results in excessive wear between the bearing surfaces of the hinge thereby requiring periodic replacement of parts and frequent readjustment of the tensioning thereof. Also, the metal to metal contact between the bearing surfaces of conventional hinges provides a source of sparks which is potentially hazardous in certain situations, such as in hospital operating rooms, chemical plants, aircraft and space vehicles, explosive storage areas and various other defense or military projects.

Also, many of the conventional friction hinges are capable of having their tension adusted and set only at the point of ultimate installation and final use and are incapable of having their tension properly set prior to final installation such as at the factory and point of manufacture or assembly.

Therefore, an object of this invention is to provide a novel friction hinge which is simpler in design and more inexpensive in construction and superior in performance to friction hinges presently available.

Still another object is to provide a noiseless self-lubricating friction hinge which does not have metal to metal bearing surfaces and the tension of which can be preset prior to installation in the final assembly with which it is to be used.

These and other objects and advantages of this invention will more fully appear from the following description made in connection with the accompanying drawings wherein like reference characters refer to the same or similar parts throughout the several views, and in which:

FIG. 1 is a perspective view of one preferred embodiment of this invention;

FIG. 2 is a vertical longitudinal sectional view thereof taken on the line 2—2 of FIG. 3; and FIG. 3 is a cross sectional view thereof taken on the line 3—3 of FIG. 2.

Referring to the drawings, the illustrated hinge assembly includes a female hinge member 5, which member in the illustrated embodiment is formed of non-metallic material, preferably plastic, having sufficient inherent structural strength for the usage intended, and preferably having a self-lubricating quality which eliminates the need for additional lubricating means, and which provides tough, smooth long wearing noiseless bearing surfaces capable of frictionally gripping the bearing surfaces of the male member or hinge pin 6 of the hinge assembly (hereinafter to be described) with sufficient strength, tension or resistance to provide the frictional sustaining power necessary to hold the parts connected by the hinge assembly in any relative position desired. Nylon is a particularly suitable material providing all the desired characteristics. The female member 5 is provided with an interior opening 7 of generally key-hole shape when viewed in cross section, said opening extending entirely through said member from one end thereof to the other.

The upper portion of the opening 7 comprises a cylindrical bore which provides a partly cylindrical bearing sleeve or surface 8 which is of substantially the same curvature as the hinge pin 6 and which is more than 180 degrees in circumference, the ends thereof terminating at the shoulders 9. The sleeve 8 is adapted to telescopically receive and frictionally engage the cylindrical male hinge pin member 6, the knurled outer end 6a of which is adapted to be connected in any suitable manner to one of the parts to be hingedly connected by the hinge assembly of this invention. The male hinge member may be of any suitable material, such as hard brass for example.

The bottom portion of the opening 7 provides a channel 10 of generally rectangular cross-sectional shape, which channel is adapted to telescopically receive a movable and removable friction bearing block member 11 of similar cross sectional shape, and which, in the illustrated embodiment is formed of the same material as the female hinge member 5.

The bearing member 11 is provided with an upper longitudinally extending partly cylindrical groove or bearing surface 12 of substantially the same curvature as the hinge pin 6 for engaging that portion of the hinge pin which is not enclosed by the bearing sleeve 8. Thus, the bearing sleeve 8 and bearing groove 12 cooperate to substantially completely enclose the hinge pin and frictionally engage same throughout their entire length.

Bearing member 11 is movable in channel 10 towards and away from the hinge pin to facilitate installation of the hinge pin in the upper bore of the female member 5 and to enable the frictional resistance between the cooperating bearing surfaces of the male and female members to be selectively varied to obtain the frictional resistance desired.

The base 5a of the female member 5 is provided with an opening extending from the bottom face thereof to the bottom of the channel 10 transversely thereof and communicating therewith, the inner end of said opening comprising the threaded bore 13, the outer end of said opening comprising the enlarged counterbored socket portion 14. A set screw or screw plug 15 is provided which is threaded into the threaded bore 13 for engagement of the inner end of the plug with the underside or base of the bearing member 11, the outer end of said plug having a head of hexagonal or other suitable cross sectional shape to be engaged by a wrench or other suitable tool for turning said plug, the enlarged counterbored portion 14 being provided for reception of such a tool.

The screw plug is also provided with an internally threaded bore 15a which is adapted to threadedly receive a threaded anchoring bolt 16 to which is attached the other part intended to be hingedly connected by this hinge assembly. However, it will be understood that any suitable means may be utilized for connecting the hinge assembly of this invention to the parts to be hingedly interconnected thereby.

The bottom face or base of the bearing member 11 is preferably provided with a socket 11a for receiving the inner end of said screw plug 15 to prevent longitudinal shifting movement of said bearing member during use.

Thus, the screw plug 15 presses against the bearing member 11 annd presses the curved bearing surface 12 thereof against the hinge pin 6, which action in turn causes the hinge pin to be pressed against the bearing sleeve 8 to provide the desired frictional engagement between the cooperating bearing surfaces of the male and female components of the hinge assembly. The degree of frictional resistance between these components is easily adjusted by tightening or loosening of said screw plug 15 to the desired degree.

The illustrated hinge assembly comprising the hinge pin 6, the female member 5, the bearing block 11 and the screw plug 15 can be assembled and the friction preset at the point of manufacture with the parts to be connected by said hinge assembly being connected thereto at some subsequent time. Where desirable, the hinge pin can be removed after the friction is preset, and subsequently be reinstalled in the female member without requiring readjustment of the screw plug or resetting of the frictional tension.

It will be further appreciated that the hinge assembly of this invention is extremely simple in design and construction and extremely simple to assemble and set to the desired degree of frictional resistance.

Because the portions of the female member and bearing block which engage the hinge pin are made entirely of non-metallic material, preferably nylon, there is no metal to metal bearing surface contact, thereby reducing wear, eliminating noise, eliminating potential sparking, and forming a self-lubricating hinge.

It will be understood that it is within the scope of this invention to form the component parts of the hinge assembly in any manner which will insure that there is no metal to metal contact between the bearing surfaces. Thus, the hinge pin may be formed of non-metallic material, and the female member and bearing block formed of metal, or all the bearing surfaces may be non-metallic. Also, non-metallic linings can be interposed between the opposing surfaces of the male and female components.

Where the axis of rotation of the hinge is horizontal, such as in auto hoods, and trunk lids, visors, rear vision mirrors and the like, the frictional resistance can be set to overcome the force of gravity and hold the lid, hood, visor, mirror, etc., in any desired elevated position against gravity.

Where the axis of rotation of the hinge is vertical, such as in windows and doors, the frictional resistance can be set to hold the door, window, etc., in any desired position and prevent inadvertent movement and slamming shut thereof, such as by air currents to which the door or window would normally be subjected. Also, the hinge of this invention permits the use of lighter material in household door construction.

Also, the hinge of this invention enables a hingedly mounted element to be maintained in any desired position between the extreme limits of movement of which it is capable, such as between completely open and completely closed positions, and therefore is capable of performing in a manner far superior to conventional freely movable hinges. Thus, for example, auto trunk lids are conventionally spring biased towards a completely raised open position, and cannot be maintained in some intermediate position. Therefore, if cargo carried in the trunk does not permit complete closing of the lid, the lid will assume the completely raised position which usually obstructs the vision of the driver through the rear window, or else the lid must be tied down in some lower position. The friction hinge of this invention overcomes these problems, and enables the lid to be maintained in any desired intermediate position.

One contemplated application of the hinge of this invention to a household pot or pan is as follows: The pot or pan would be provided with a vertical anchoring pin. This pin would be a substitute for the illustrated threaded anchoring bolt 16. The cover would be provided with a preset hinge having a downwardly facing socket or seat formed therein for slidably and removably receiving the upper end of the anchoring pin to enable the hinge and cover to be attached to the cover thereby. The cooperating parts of the anchoring pin and hinge socket would preferably be provided with some means for preventing inadvertent disengagement thereof, such as a snap type connection to prevent the cover falling off while pouring from the pot or pan and yet permitting ready disconnection of the cover and pot or pan when the cover is not needed or for washing thereof. This arrangement would permit raising and lowering of the cover without removing it and would enable the cover to be positively held in any desired raised position.

An alternative form of the aforementioned arrangement would be to have the anchoring pin secured to the hinge, with the lower end of the pin and the pot or pan being provided with cooperating connection means (such as the snap-on type) for removably mounting the cover on the pot or pan in such fashion as to prevent inadvertent disconnection thereof while permitting easy intentional disconnection thereof.

Also, the hinge of this invention is much simpler in design and operation than most conventional hinges and enables the parts interconnected thereby to be disconnected faster and easier than is possible with many of the conventional hinges.

It will also be appreciated that when the hinge pin is removed from the female member and the screw plug is seated in the socket of the bearing block, the shoulders 9 in the key-hole opening cooperate therewith to prevent removal or falling out of the bearing block from said opening, since the shoulders 9 in one preferred embodiment serve as stop means for limiting the movement of the bearing block towards the upper bore and thereby prevent movement of the block away from the plug a sufficient distance to completely remove the plug from the socket of the bearing block. Thus, the frictional resistance can be pre-set at the point of manufacture, and then the hinge pin can be removed for any purpose desired, such as for attachment to some part or to facilitate storage or shipping without interfering with said pre-setting and without fear of loss or misplacement of the block member 11.

It will, of course, be understood that various changes may be made in the form, details, arrangement and proportions of the various parts without departing from the scope of my invention.

What is claimed is:

1. A friction hinge assembly comprising male and female hinge means, said male hinge means comprising a cylindrical hinge pin, said female hinge means including a female hinge member having a bore formed therein adapted to telescopically receive said hinge pin and providing a partly cylindrical bearing surface of substantially the same curvature as said pin and adapted to frictionally engage same, said female hinge means also including a bearing member adapted to be seated in said bore opposite said bearing surface for engagement with said pin, said bearing member having a groove formed therein of substantially the same curvature as said pin and adapted to frictionally engage same, said bearing member being movable in said bore toward and away from said pin, there being a threaded opening formed in said female member communicating with the exterior thereof and intersecting said bore on the side thereof opposite said bearing surface, and a threaded screw plug adapted for insertion in said opening and threaded engagement therewith and adapted to engage said bearing member and press same against said pin to obtain a desired frictional resistance between said pin and said female and bearing members, said plug having a threaded bore, and threaded means adapted for insertion in and threaded engagement with the bore of said plug for anchoring said female hinge member to a supporting object.

2. A friction hinge assembly comprising male and female hinge means, said male hinge means comprising a cylindrical hinge pin, said female hinge means including a female hinge member having a partly cylindrical bore formed therein for telescopically receiving said pin, the wall defining said bore being of the same curvature as said pin and adapted to enclose more than half but less than all of the periphery of said pin, there being a channel formed in said female member in parallel relation to and communicating with said bore, said female hinge means also including a bearing member adapted to be removably and telescopically seated in said channel and movable in said channel toward and away from said pin, said bearing member having a partly cylindrical groove formed therein of the same curvature as said pin and directly opposing same, the wall of said groove being adapted to engage substantially the entire pin surface not enclosed by said partly cylindrical bearing surface, there being a threaded opening formed in said female member communicating with the exterior thereof and intersecting said channel at substantially right angles thereto, and a threaded screw plug adapted for insertion in said opening and threaded engagement therewith and adapted to engage said bearing member and press same against said pin to obtain desired frictional resistance between said pin and said female and bearing members, said bearing member having a socket formed therein for receiving said plug and preventing longitudinal movement of said bearing member, stop means disposed between said bore and channel capable of engaging said bearing member and limiting the movement thereof towards said bore, said stop means and said plug when seated in said socket preventing removal of said bearing member from said female member, said plug having a threaded bore, and threaded means adapted for insertion in and threaded engagement with the bore of said plug for anchoring said female hinge member to a supporting object, said opening including a tool receiving socket portion coaxial with and of larger diameter than the threaded portion thereof and communicating with the exterior of said female member, the outer end of said plug being disposed in said socket and spaced from the walls thereof whereby a plug turning tool can be installed in said socket in operative engagement with said plug.

References Cited by the Examiner

UNITED STATES PATENTS

| | | | |
|---|---|---|---|
| 1,074,839 | 10/1913 | Curry | 16—140 |
| 1,220,648 | 3/1917 | Leader. | |
| 1,448,277 | 3/1923 | Lenz | 287—52.09 |
| 2,004,187 | 6/1935 | Bommer | 287—52.08 X |
| 2,398,343 | 4/1946 | Wyrick. | |
| 2,420,205 | 5/1947 | Sjogren | 287—52.09 |
| 2,474,644 | 6/1949 | Aitcheson et al. | |
| 2,622,120 | 12/1952 | Knasko et al. | 339—236 X |
| 2,841,774 | 7/1958 | Romanek | 339—237 |
| 2,910,315 | 10/1959 | Stevens | 287—52.09 |
| 3,040,339 | 6/1962 | Sperzel | 16—140 |
| 3,077,282 | 2/1963 | Eggers. | |

FOREIGN PATENTS

| | | |
|---|---|---|
| 503,749 | 6/1951 | Belgium. |
| 75,159 | 12/1952 | Denmark. |

JOSEPH D. SEERS, *Primary Examiner.*

DONLEY J. STOCKING, *Examiner.*